Dec. 26, 1944.   F. W. WOHLFIELD   2,365,792
FENDER, FENDER CONSTRUCTION AND ASSEMBLY
Filed June 6, 1941   2 Sheets-Sheet 1
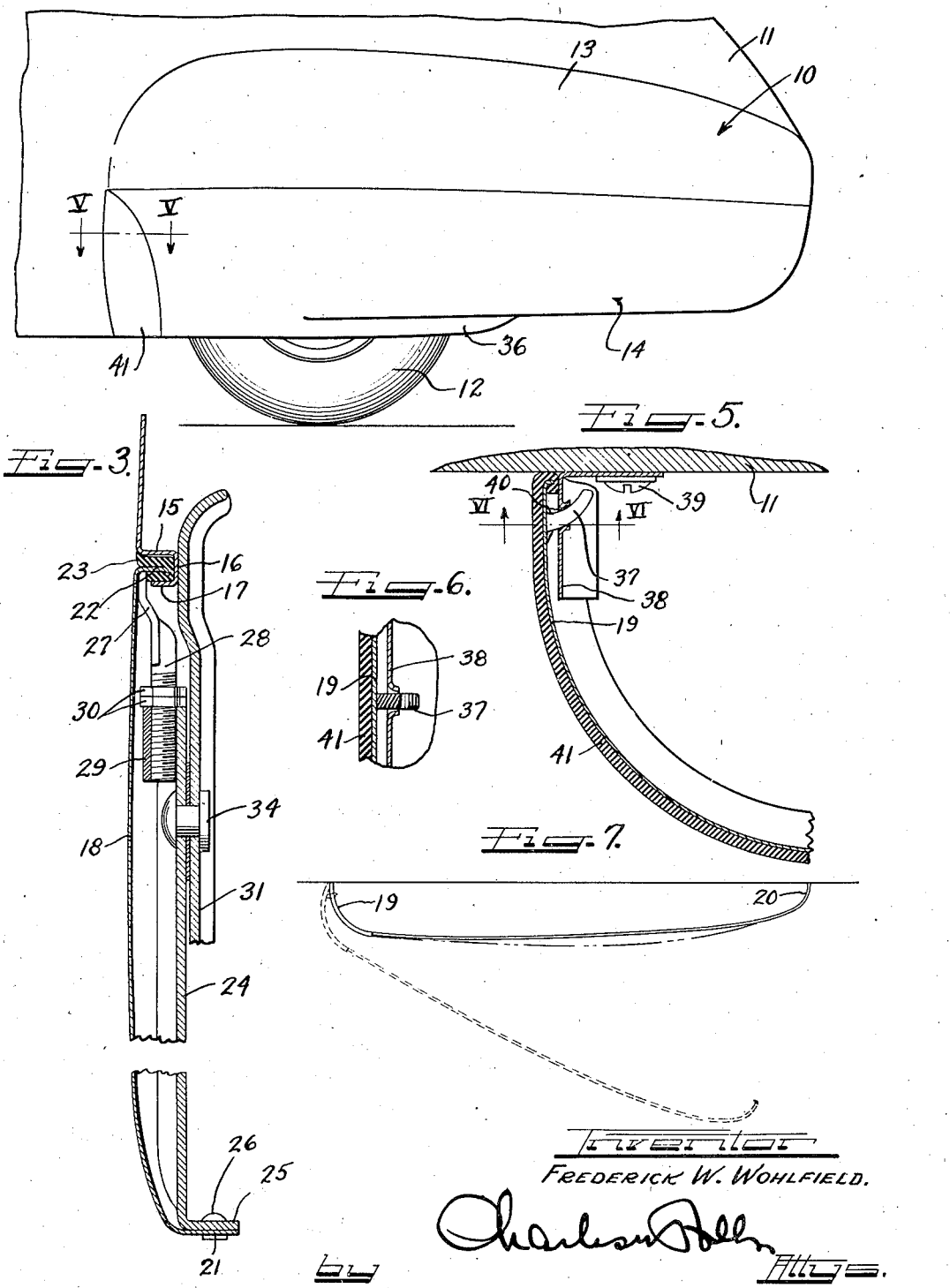
Inventor
FREDERICK W. WOHLFIELD.

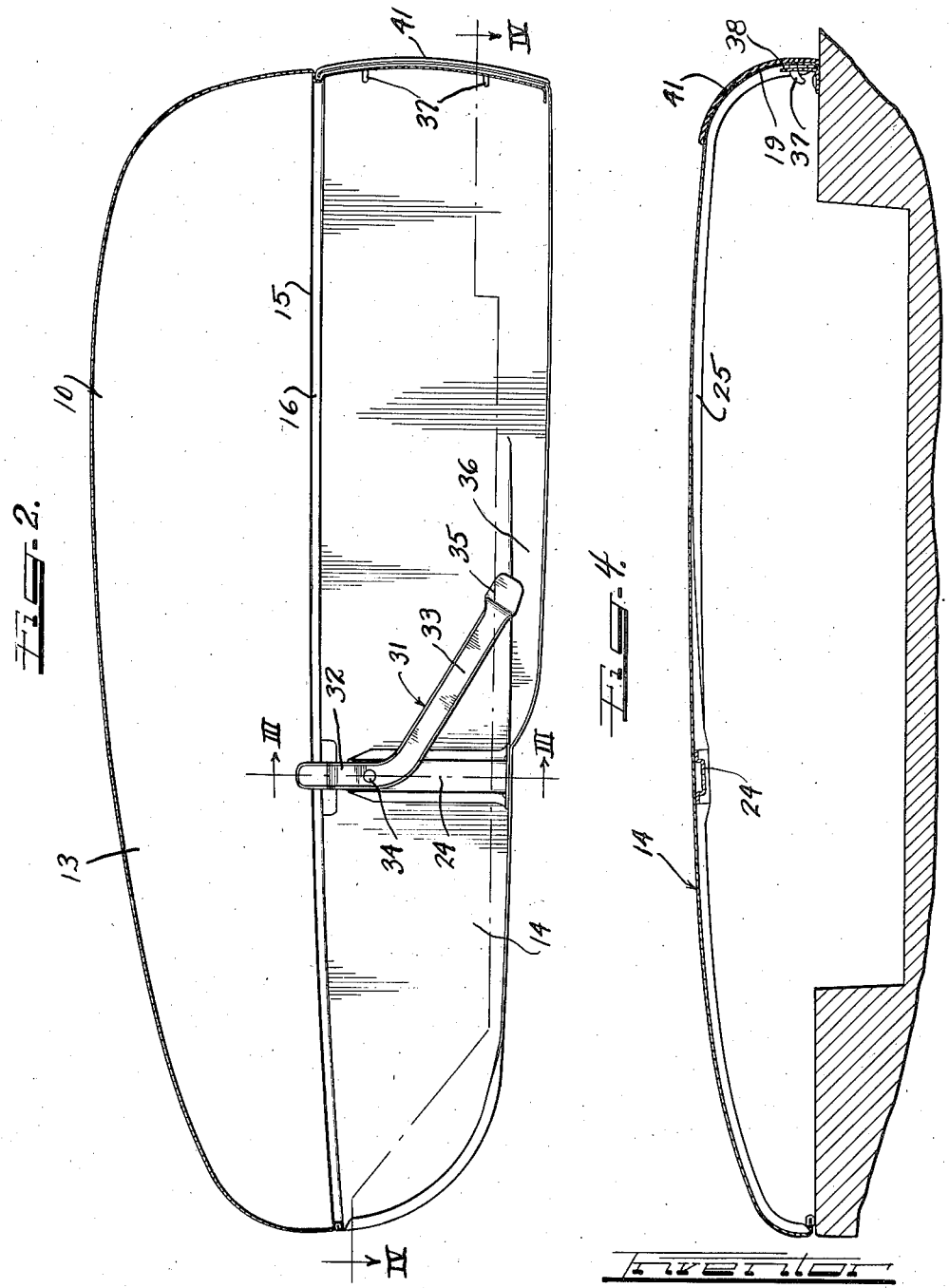

Patented Dec. 26, 1944

2,365,792

UNITED STATES PATENT OFFICE 2,365,792

FENDER, FENDER CONSTRUCTION, AND ASSEMBLY

Frederick W. Wohlfield, Detroit, Mich., assignor to Houdaille-Hershey Corporation, Detroit, Mich., a corporation of Michigan Application June 6, 1941, Serial No. 396,811

2 Claims. (Cl. 280—153)

This invention relates to a fender, fender construction and assembly, and more particularly to a fender assembly in which the lower half of the fender is removably and pivotally mounted for movement in a horizontal plane away from the remaining portion of the fender.

In the vehicle industry, and particularly in the automobile industry, various means have been utilized to improve the appearance of vehicle fenders. The usual vehicle fender is provided with an opening which affords access to the vehicle wheel, and which permits the ready removal of the wheel in an axial direction. Since this opening inherently presents an ugly outward appearance, detachable fender shields have been employed to substantially cover this opening. Other efforts have been made to overcome the disadvantage of having a relatively large opening in the downwardly depending side wall of the fender by providing a fender which has no wheel access opening but in which the entire fender is hingedly mounted on the vehicle car or body for movement upwardly and away from the vehicle wheel.

One of the principal features of the present invention is to provide a fender and fender construction in which a two-part fender is provided, the line of severance being substantially horizontal at substantially the mid-point of the fender from top to bottom, and the lower portion of which is removably and pivotally mounted on the car body for permitting ready access to the wheel.

As the term "fender" shall hereinafter be employed, it refers to any form of wheel fender in its broad sense, whether such fender be separate from the vehicle body part, partly separate from the vehicle body part, or actually an integral part of the vehicle body, and whether or not it projects outwardly away from the principal body portion of the vehicle.

It is an object of the present invention to provide a novel fender, fender construction and assembly.

It is a further object of this invention to provide a novel fender assembly which is economical to manufacture and which is rugged and reliable in use.

It is a still further object of this invention to provide a two-part fender construction, one of the parts being pivotally mounted on the other part.

Another object of this invention is to provide a novel two-part fender construction in which the line of severance between the two parts is substantially horizontal and in which the lower part is removably secured to the upper part.

Another and further object of this invention is to provide a novel panel member for vehicle bodies and to a novel method of securing the same thereon.

The novel features which I believe to be characteristic of my invention are set forth with particularity in the appended claims. My invention itself, however, both as to its organization and manner of construction, together with further objects and advantages thereof, may best be understood by reference to the accompanying drawings, in which:

Figure 1 is a front elevational view of the vehicle fender assembly;

Figure 2 is an enlarged rear elevational view of the fender assembly shown in Figure 1;

Figure 3 is an enlarged vertical sectional view through the center of the fender assembly as taken along the line III—III of Figure 2;

Figure 4 is a horizontal sectional view through the fender assembly taken along the line IV—IV of Figure 2, the latching lever being removed for purposes of clarity and illustration;

Figure 5 is a horizontal sectional view through the front end of the assembly showing how the lower portion of the fender construction is supported on the vehicle body part, the view being taken along the line V—V of Figure 1;

Figure 6 is a fragmentary sectional view as taken along the line VI—VI of Figure 5; and, Figure 7 is a diagrammatic view illustrating the manner in which the lower portion of the fender is moved into position on the vehicle body.

Referring now to the various figures of the drawings, which illustrates one embodiment of the present invention, there is illustrated therein a vehicle fender 10 mounted on a vehicle body 11 over a vehicle wheel 12. The fender 10 includes an upper portion 13 which is substantially permanently secured to the vehicle body 11 and a lower portion 14 which is removably secured to the vehicle body 11. The upper and lower portions 13 and 14 together form a fender of the type which is commonly known to the industry as a fender of the "high crown" type. The exact configuration of this fender construction may, of course, vary through wide limits without departing from the spirit and scope of the present invention.

The lower edge of the upper fender portion 13 is bent inwardly as at 15 then downwardly as at 16 and finally forwardly as at 17 to provide a channel formation. This formation on the lower edge of the upper portion 13 not only stiffens the upper portion 13 but also provides a supporting medium for the lower portion 14 of the fender as will hereinafter be more fully explained.

The lower portion 14 of the fender 10 includes an elongated panel portion 18 which extends the full length of the fender and forms a part thereof. The front and rear ends of the panel portion 18 are rounded as at 19 and 20 to complete the fender formation. The lower edge of the fender portion 14 is provided with an inwardly bent flange 21. The upper edge is similarly provided with a rearwardly bent flange 22 on which is secured a rubber molding 23. The rubber molding 23 is of such a size as to snugly fit within the channel of the upper fender portion 13 formed by the flanges 15, 16 and 17.

The lower portion 14 of the fender 10 is reinforced by a strut 24 which extends upwardly behind the panel portion 18 from the lower base flange 21 to a point in proximity to the upper flange 22. The strut 24 has a base portion 25 which is seated on the base flange 21 and is secured thereto in any suitable manner, such as by rivets 26. In order that this strut member 24 may possess sufficient rigidity without employing an undue amount of metal therein, it is preferably channel shaped in cross section.

Mounted on the top of the strut 24 is a vertically adjustable brace member 27 which extends up against the top flange 22 and also lies against the inner face of the panel portion 18 in proximity to the top flange 22. This adjustable plate 27 is carried on a threaded stud 28 which extends down into a recess formed by the upper portion of the strut 24 and a strap bracket 29 which is secured to the strut 24. A pair of nuts 30 are fitted onto the threaded shank of the stud 28 and are tightened down against the top of the strut 24 to force the plate 27 upwardly into tight engagement with the top flange 22.

Mounted on the strut 24 is a latching arm 31 which includes a short leg portion 32 and a relatively long leg portion 33, disposed at an angle with respect to the short leg portion 32. This latching arm 31 may be conveniently mounted on the strut 24 by a mounting stud or rivet 34 carried on the strut 24. The short leg portion 32 of the latching arm 31 is shaped to engage the flange 16 of the upper fender portion 13 as is clearly shown in Figure 3. The long leg portion 33 of the latching arm 31 extends downwardly to the bottom of the assembly and its lower end 35 is offset with respect to the remaining portion of the latching arm 31 so as to enable it to be seated on the pressed in portion 36 of the lower fender portion 14.

The forward end of the lower portion 14 of the fender 10 is provided with a pair of arcuately shaped fingers 37 which are welded or otherwise suitably secured to the inner face of the forward end portion 19 of the fender part 14. These arcuate shaped fingers are arranged to extend rearwardly and inwardly as is clearly shown in Figure 5. The upper portion 13 has a downwardly extending angle formation 38 (see Figure 5) which is screwed as at 39 to the vehicle body 11. This angle formation is slotted opposite the fingers 37 as at 40. The fingers 37 on the lower fender portion 14 in conjunction with the slotted portions 40 in the upper fender portion 13 are so arranged that both vertical support and lateral restraint is provided for the movable lower fender portion 14. As will best be understood by reference to the diagrammatic view shown in Figure 7, the lower fender portion is positioned as shown by the even broken lines of Figure 7 with the forward end of the lower fender portion against the vehicle body. As the lower fender portion 14 is rocked in a horizontal plane the lower fender portion 14 is moved to the position as shown by the long and short broken lines in Figure 7. During this movement the fingers 37 move into the slots 40 and support the lower fender portion 14 thereby. During this movement of the lower fender portion 14, the latching arm 31 is positioned so that the long leg portion 33 extends substantially straight downwardly while the short leg portion is below the top edge of the panel 18. When the lower fender portion 14 has been moved to the position as shown by the long and short broken lines of Figure 7 the latching arm 31 is rocked to the position as shown in Figure 2. This movement causes the rubber cushioning strip on the top flange 22 to be forced tightly into the channel formed by the flange portions 15, 16 and 17 of the upper fender portion 13. The flange portion 17 thereby provides vertical support for the entire length of the lower fender portion 14 while the engagement of the short leg portion 32 of the latching arm 31 against the flange portion 16 causes the lower fender portion 14 to be held in tight seated engagement within the channel formed by the flanges 15, 16 and 17.

In the particular embodiment of the invention illustrated in the drawings a scuff pad 41 is provided on the forward end of the lower fender portion 14.

While I have shown a particular embodiment of my invention it will, of course, be understood that I do not wish to be limited thereto, since many modifications may be made, and I, therefore, contemplate by the appended claims to cover all such modifications as fall within the true spirit and scope of my invention.

I claim as my invention:

1. A fender having a depending outer wall forming a side, front and rear end portions and comprising a fixed upper part and a readily removable lower part, the junction line between said parts lying in substantially a horizontal plane and extending entirely around the outer depending wall of said fender, a portion of the lower part remote from said front end and forming said junction line being bowed slightly apart from said upper part when in an unstressed condition, means at the front of said lower part detachably engaging said fixed upper part of the fender and pivotally supporting said lower part on said upper part for movement about a vertical axis, means for supporting the rear end portion of said lower part on said upper part and for warping the bowed portion of said lower part under tension against said upper part.

2. A fender having a depending outer wall forming a side, front and rear end portions comprising an upper part and a lower part, the junction line between said parts lying substantially midway between the top and bottom of the fender in substantially a horizontal plane extending entirely around the outer depending wall of said fender, the lower edge of said upper part being bent to form an outwardly opening channel and the upper edge of said lower part being formed to be nested in said channel of said upper part, thereby to provide vertical support for said lower part, additional means at one end of said lower part for pivotal support of said lower part on said upper part, a portion of said lower part remote from said pivot being normally bowed away from said upper part, and means for warping said bowed portion into engagement with said channel and for restraining outward movement of said lower part away from said upper part.

FREDERICK W. WOHLFIELD.